United States Patent
Song et al.

(10) Patent No.: US 10,349,352 B2
(45) Date of Patent: Jul. 9, 2019

(54) METHOD AND DEVICE FOR REDUCING POWER OF DEVICE IN WIRELESS COMMUNICATION SYSTEM SUPPORTING DIRECT DEVICE TO DEVICE COMMUNICATION

(71) Applicant: Samsung Electronics Co., Ltd., Suwon-si, Gyeonggi-do (KR)

(72) Inventors: Seongwook Song, Seoul (KR); Hyungjong Kim, Seongnam-si (KR); Jonghan Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 352 days.

(21) Appl. No.: 15/121,537

(22) PCT Filed: Feb. 25, 2015

(86) PCT No.: PCT/KR2015/001815
§ 371 (c)(1),
(2) Date: Aug. 25, 2016

(87) PCT Pub. No.: WO2015/130076
PCT Pub. Date: Sep. 3, 2015

(65) Prior Publication Data
US 2016/0366645 A1    Dec. 15, 2016

(30) Foreign Application Priority Data
Feb. 25, 2014    (KR) .................... 10-2014-0021720

(51) Int. Cl.
*H04W 52/02* (2009.01)
*H04W 76/14* (2018.01)

(52) U.S. Cl.
CPC ....... *H04W 52/0229* (2013.01); *H04W 76/14* (2018.02); *Y02D 70/1262* (2018.01);
(Continued)

(58) Field of Classification Search
CPC .. H04W 52/0229; H04W 76/14; Y02D 70/21; Y02D 70/25; Y02D 70/1262; Y02D 70/24
See application file for complete search history.

(56) References Cited

U.S. PATENT DOCUMENTS 9,066,258 B2 * 6/2015 Li .................... H04W 28/02
2008/0219228 A1  9/2008 Seok et al.
(Continued)

FOREIGN PATENT DOCUMENTS

KR   10-2012-0087160 A   8/2012
WO       2013/081370 A1   6/2013
WO       2013/154546 A1  10/2013

*Primary Examiner* — Sharad Rampuria
(74) *Attorney, Agent, or Firm* — Jefferson IP Law, LLP

(57) ABSTRACT

The present invention relates to a method and a device for reducing the power of a device in a wireless communication system supporting direct device to device (D2D) communication. A method, for transmitting a signal of a device in a wireless communication system supporting direct D2D communication according to the present invention, comprises the steps of: entering sleep mode in direct D2D communication between a device and an opponent device; if data to be transmitted to the opponent device is generated, transmitting a paging signal for the opponent device to a base station connected to the device, thereby requesting transmission of the paging signal to the opponent device; and resuming the D2D communication with the opponent device that has received the paging signal through the base station.

12 Claims, 18 Drawing Sheets

(52) U.S. Cl.
CPC .............. *Y02D 70/21* (2018.01); *Y02D 70/24* (2018.01); *Y02D 70/25* (2018.01)

(56) References Cited

U.S. PATENT DOCUMENTS

| | | | |
|---|---|---|---|
| 2009/0147715 A1* | 6/2009 | Ruy | H04W 52/0216 370/311 |
| 2010/0165896 A1* | 7/2010 | Gong | H04W 52/0216 370/311 |
| 2011/0103319 A1 | 5/2011 | Abraham et al. | |
| 2011/0237231 A1* | 9/2011 | Horneman | H04W 52/0216 455/414.1 |
| 2013/0170398 A1 | 7/2013 | Kwon | |
| 2013/0272182 A1* | 10/2013 | Li | H04W 28/02 370/311 |
| 2013/0297810 A1 | 11/2013 | Ho et al. | |
| 2014/0219261 A1 | 8/2014 | Johnsson | |
| 2015/0003440 A1 | 1/2015 | Lim et al. | |

\* cited by examiner

METHOD AND DEVICE FOR REDUCING POWER OF DEVICE IN WIRELESS COMMUNICATION SYSTEM SUPPORTING DIRECT DEVICE TO DEVICE COMMUNICATION

TECHNICAL FIELD

The present invention relates to a wireless communication system supporting direct device to device communication, and more particularly, to a method and a device for reducing power of a device in a wireless communication system supporting direct device to device communication.

BACKGROUND ART

Generally, a mobile communication system has been developed to provide a voice service while securing activity of a user. However, the mobile communication system gradually extends an area from a voice service to a data service. At present, the mobile communication system has been developed to provide a high-speed data service. However, since the current mobile communication system that is providing services suffers from a resource shortage phenomenon and does not meet a user demand for higher-speed services, there is a need for a more developed mobile communication system.

Meanwhile, if a device performs direct communication with an opponent device without using a base station, the device uses relatively less radio resources when performing communication using the existing radio network than when performing communication using the base station, and therefore has a great advantage in radio resource efficiency.

Further, since a method for discovering devices around a device is supported, a device may directly provide required information to devices that want the information, thereby greatly increasing efficiency in supporting an advertising service, a social networking service (hereinafter, SNS), or the like.

By the way, when device to device communication is performed, a device is connected to both an opponent device and a base station and when a device is linked to discontinuous reception, a receiver needs to be periodically operated to confirm whether there are transmission data from the opponent device, such that current consumption is highly likely to be increased.

DISCLOSURE OF INVENTION

Technical Problem

The present invention has been made in order to solve the above problems, and an object of the present invention is to provide a method and a device for reducing power of a device in a wireless communication system supporting direct device to device communication.

Solution to Problem

In order to achieve the objects, according to an embodiment of the present invention, a method for transmitting a signal of a device in a wireless communication system supporting direct device to device communication (D2D communication) may include: entering sleep mode in the direct D2D communication between a device and an opponent device; if data to be transmitted to the opponent device are generated, transmitting a paging signal for the opponent device to a base station connected to the device to request a transmission of the paging signal to the opponent device; and resuming the D2D communication with the opponent device receiving the paging signal through the base station.

In order to achieve the objects, according to an embodiment of the present invention, a device for transmitting a signal in a wireless communication system supporting direct device to device communication (D2D communication) may include: a transceiver transmitting and receiving a signal to and from a base station or an opponent device; and a controller performing a control to enter a sleep mode in the direct D2D communication between a device and an opponent device, if data to be transmitted to the opponent device are generated, transmit a paging signal for the opponent device to a base station connected to the device to request a transmission of the paging signal to the opponent device, and resume the D2D communication with the opponent device receiving the paging signal through the base station.

In order to achieve the objects, according to an embodiment of the present invention, a method for transmitting a signal of a base station in a wireless communication system supporting the direct device to device communication (D2D communication) may include: receiving a paging signal for a second device, which is an opponent device of a first device, from the first device performing direct D2D communication; and transmitting the received paging signal to the second device.

In order to achieve the objects, according to an embodiment of the present invention, a base station for transmitting a signal in a wireless communication system supporting direct device to device communication (D2D communication) may include: a transceiver transmitting and receiving a signal to and from a device; and a controller performing a control to receive a paging signal for a second device, which is an opponent device of the first device, from the first device performing the direct D2D communication and transmit the received paging signal to the second device.

Advantageous Effects of Invention

In accordance with the present invention, the base station relays the paging message transmitted from the device supporting the direct device to device communication, and therefore the device that is being operated in the sleep mode need not monitor whether the signal from the opponent device performing the direction device to device communication is received or not and is enough to monitor only whether the signal from the base station is received. As a result, it is possible to reduce the power consumption of the device supporting the direct device to device communication.

MODE FOR THE INVENTION

Figure 1:
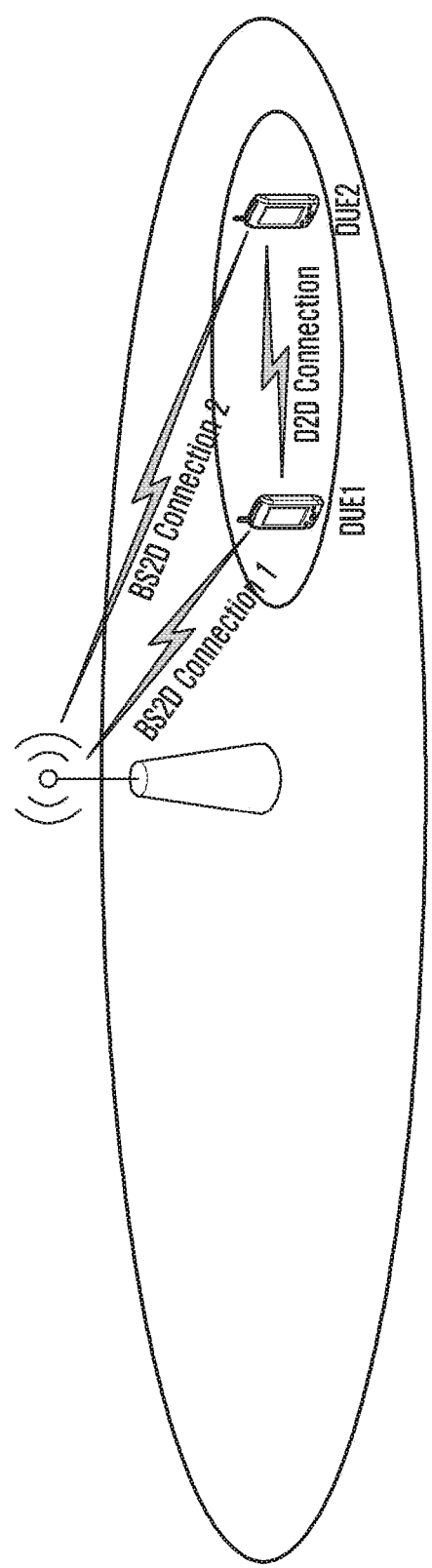
FIG. 1 is a diagram illustrating an example of D2D communication in a cellular network.

Hereinafter, exemplary embodiments of the present invention will be described in detail with reference to the accompanying drawings. In this case, it is noted that like reference numerals denote like elements in the accompanying drawings. Further, detailed descriptions related to well-known functions or configurations will be ruled out in order not to unnecessarily obscure the subject matter of the present invention.

In describing the exemplary embodiments of the present invention in the present specification, a description of technical contents which are well known to the art to which the present invention belongs and are not directly connected with the present invention will be described. This is to more clearly transfer a gist of the present specification by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the present invention and methods accomplishing the same will become apparent from the following detailed description of embodiments with reference to the accompanying drawings. However, the present invention is not limited to the embodiments disclosed herein but will be implemented in various forms. The embodiments have made disclosure of the present invention complete and are provided so that those skilled in the art can easily understand the scope of the present invention. Therefore, the present invention will be defined by the scope of the appended claims. Like reference numerals throughout the specification denote like elements.

In this case, it may be understood that each block of processing flow charts and combinations of the flow charts may be performed by computer program instructions. Since these computer program instructions may be installed in processors of a general computer, a special computer, or other programmable data processing apparatuses, these computer program instructions executed through the process of the computer or the other programmable data processing apparatuses create means performing functions described in block(s) of the flow chart. Since these computer program instructions may also be stored in a computer usable memory or a computer readable memory or other programmable data processing apparatuses that may direct a computer or other programmable data processing apparatuses in order to implement functions in a specific scheme, the computer program instructions stored in the computer usable memory or the computer readable memory may also produce manufacturing articles including instruction means performing the functions described in the block(s) of the flow chart. Since the computer program instructions may also be installed in a computer or other programmable data processing apparatuses, they perform a series of operation steps on the computer or the other programmable data processing apparatuses to create processes executed by the computer, such that the computer program instructions executing the computer or the other programmable data processing apparatuses may also provide steps for performing the functions described in the block(s) of the flow chart.

In addition, each block may indicate some of modules, segments, or codes including one or more executable instructions for executing a specified logical function(s). Further, it is to be noted that functions mentioned in the blocks may be performed regardless of a sequence in some alternative embodiments. For example, two blocks that are shown in succession may be simultaneously performed in fact or may be sometimes performed in a reverse sequence depending on corresponding functions.

Here, the term '-unit' used in the present embodiment means software or hardware components such as FPGA and ASIC and the 'unit' performs any roles. However, the meaning of the '~unit' is not limited to software or hardware. The '~unit' may be configured to be in a storage medium that may be addressed and may also be configured to reproduce one or more processor. Accordingly, as one example, the '~unit' includes components such as software components, object oriented software components, class components, and task components and includes processors, functions, attributes, procedures, subroutines, segments of program code, drivers, firmware, microcode, circuit, data, database, data structures, tables, arrays, and variables. The functions provided in the components and the 'units' may be combined with a smaller number of components and the 'units' or may further separated into additional components and 'units'. In addition, the components and the 'units' may also be implemented to reproduce one or more CPUs within a device or a security multimedia card.

Hereinafter, a method for maximizing efficiency of a battery in direction device to device communication or device-to-device communication (hereinafter, used together with D2D communication) system will be described.

FIG. 1 is a diagram illustrating an example of D2D communication in a cellular network.

The D2D is a communication mode of using resources allocated from a base station between neighbor devices to perform D2D communication without using the base station. In cellular network based D2D communication, a paired DUE1 (D2D UE1) and DUE1 is each connected to a base station through a BS2D connection 1 and a BS2D connection 2. At the same time, the DUE1 and a DUE2 form a D2D connection between devices.

Further, when a data transmission between the devices is required, the device directly transmits data through the D2D connection between the devices, instead of transmitting the data through the existing cellular network.

Meanwhile, to implement low power, the device in a cellular wireless communication system controls a connection state with a network to drive a low power mode.

Figure 2:
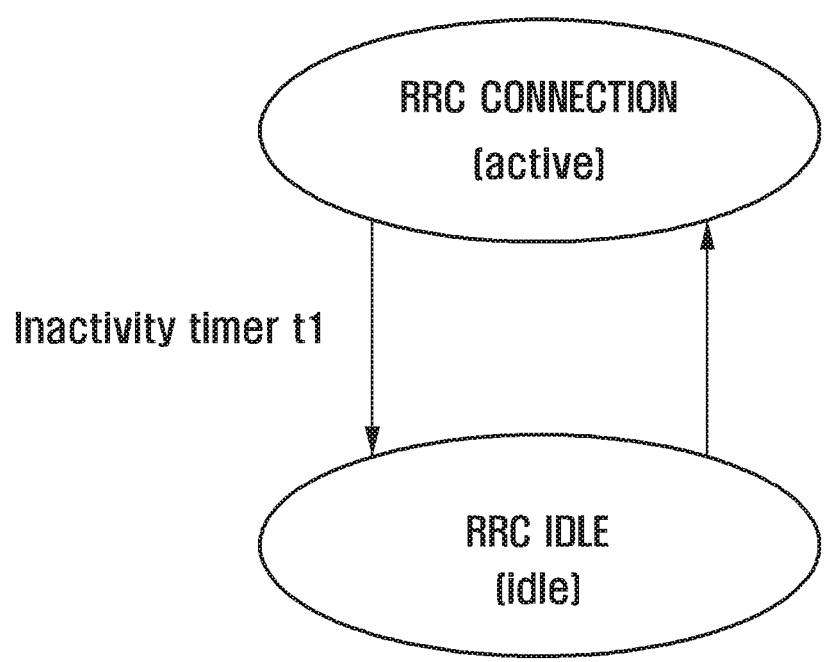
FIG. 2 is a diagram illustrating a network connection state transition of a device in a long term evolution (LTE) system.

FIG. 2 is a diagram illustrating a network connection state transition of a device in a long term evolution (LTE) system.

As illustrated in FIG. 2, the network connection state of the device may include an RRC connection mode (RRC_CONNECTED Mode) and an RRC idle mode (RRC_IDLE Mode).

The RRC connection mode (RRC_CONNECTED Mode) is in a state in which data may be transmitted between the device and the base station. In the RRC connection mode, information required for communication is stored in the device and the base station and resources for communication therebetween are allocated. Generally, current consumption is increased in a state in which the device is in an active state. Therefore, to relieve the current consumption, discontinued reception (DRX) and discontinued transmission (DTX) technologies are defined between the device and the base station and used. A DRX related parameter associated with the DRX is transmitted from the base station to the device. The DRX related parameter may include information on DRX application time, a DRX period, or the like. The device turns on or off a transceiver of the device depending on the DRX related parameter.

Figure 3:
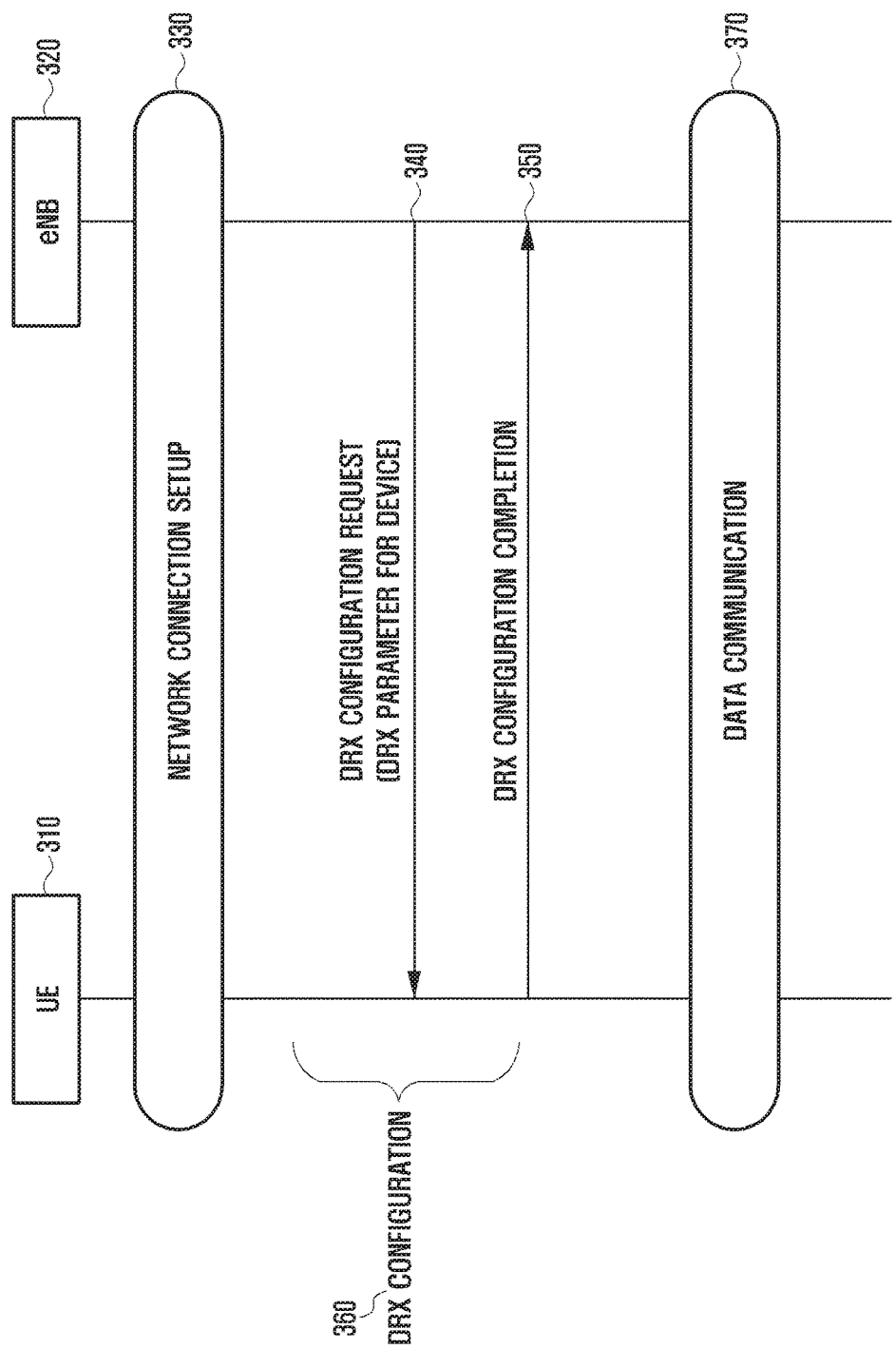
FIG. 3 is a flow chart illustrating a DRX operation process in an RRC connection state.

FIG. 3 is a flow chart illustrating a DRX operation process in an RRC connection state.

As illustrated in FIG. 3, it is assumed that a device (UE) 310 performs communication with a base station (eNB) 320.

Generally, the device 310 first goes through a process of a network connection setup 330 to perform the communication with the base station 320. In that case, the device 310 receives DRX/DTX configuration information from the eNB 320 to implement low power.

In that case, the device 310 stores the received configuration information and transmits (350) a message indicating a completion of the configuration to the eNB 320. By the above process, a DRX configuration (360) between the device 310 and the base station 320 is completed.

Next, the data transmission between the device 310 and the base station 320 starts (370).

Meanwhile, in the RRC connection (RRC_CONNECTED) state, the device 310 transmits and receives data to and from the base station 320 and then first enters a short DRX mode if data are not reached for a predetermined time.

Figure 4:
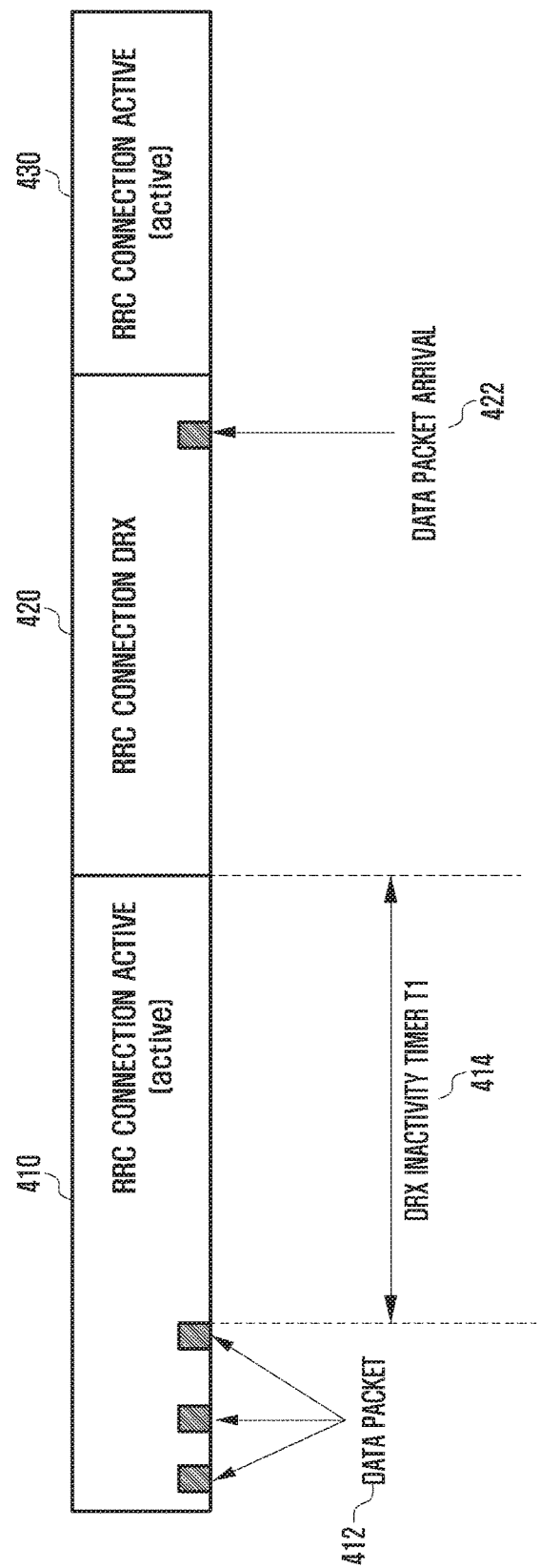
FIG. 4 is a diagram illustrating a short DRX operation process in the RRC connection state.

FIG. 4 is a diagram illustrating a short DRX operation process in the RRC connection state.

The device receiving (412) data in the RRC connection state is in an RRC connection active (RRC_CONNECTED ACTIVE) 410 state.

In the RRC connection active state, if the data reception is not received for a DRX inactive timer, that is, a T1 time (414), the state of the device is changed to a short DRX state 420 in the RRC connection (RRC_CONNECTED) state and a power supply is turned off to reduce power consumption.

If the data reception 422 is sensed in the short DRX state, the device turns on a transceiver and is again changed to an RRC connection active (RRC_CONNECTED ACTIVE) 430 state to receive data.

Meanwhile, the RRC idle mode (RRC_IDLE Mode) means that when data inactivity is continued, resources allocated from the base station to the device are released and the transceiver is in a turn-off state.

The device in the RRC idle mode periodically enables the receiver at an appointed time with the base station to confirm whether to receive the paging signal.

The RRC idle state has remarkably small current consumption, compared to the RRC connection state. However, when the data communication is resumed, a process of reallocating radio resources is required, and therefore a time delay up to a communication start time is large.

Therefore, the base station measures the data activity using an inactivity timer and thus controls the device to be transitioned from the RRC connection state to the RRC idle state and to enter a low power mode when the inactivity timer that is set to be relatively large expires.

Figure 5:
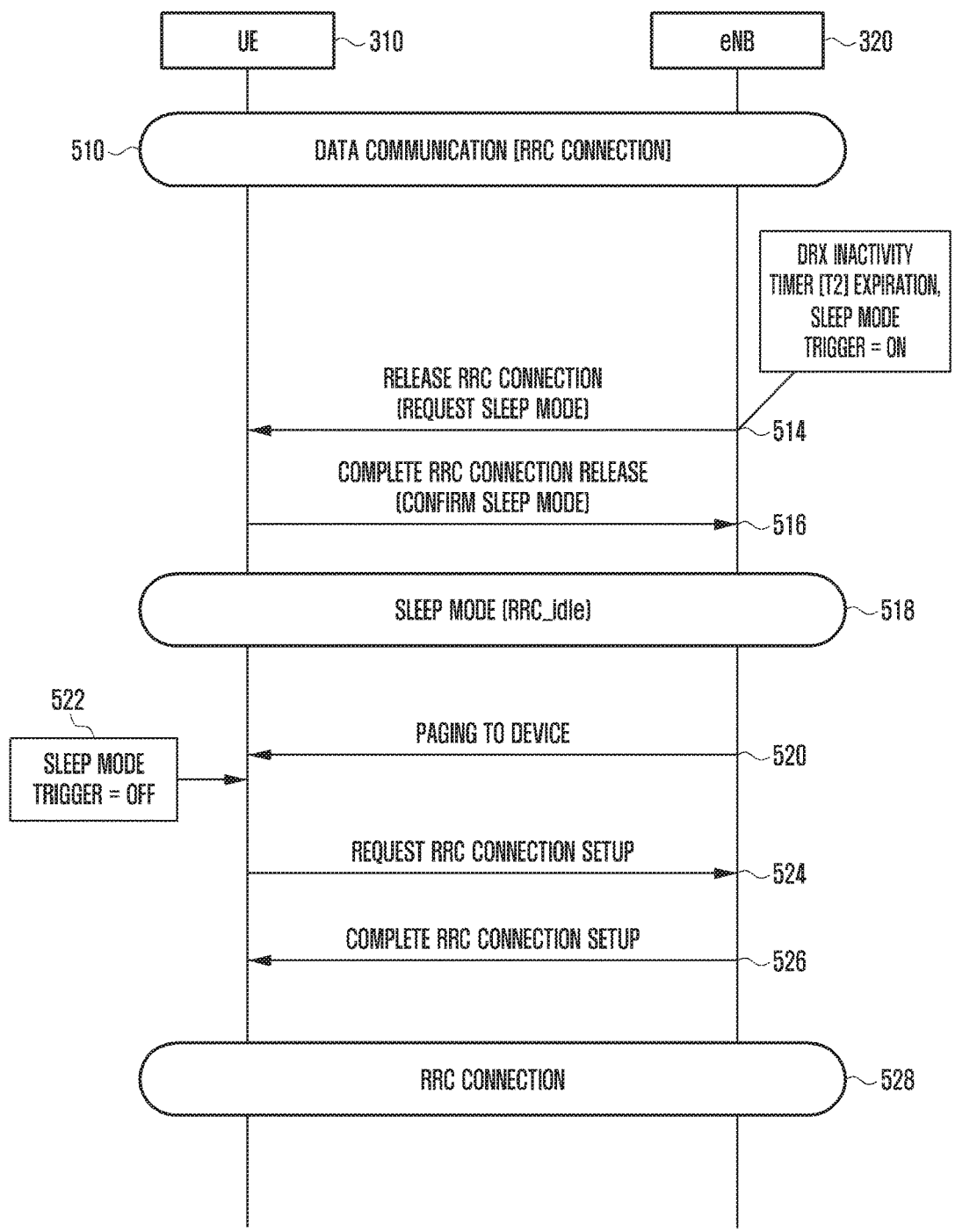
FIG. 5 is a diagram illustrating a sleep mode operation process in an RRC idle state.

FIG. 5 is a diagram illustrating a sleep mode operation process in an RRC idle state.

If the inactivity timer expires in an RRC connection (RRC_CONNECTED) state 510, a sleep mode trigger is turned on (512).

Generally, an inactivity timer T2 is longer than the inactivity timer T1 before the inactivity timer T1 enters the short DRX mode in the RRC connection state.

If the sleep mode trigger is turned on, the eNB goes through RRC connection release processes 514 and 515 and the device is changed (518) to the RRC idle (RRC_IDLE) state, that is, a sleep mode to enter the low power mode.

In the RRC idle (RRC_IDLE) state, the device periodically confirms whether to receive the paging signal. If the paging signal is received (520) from the eNB, the device wakes up (522) from the sleep mode while the sleep mode trigger is turned off.

Further, the device performs RRC connection processes 524 and 526 with the eNB.

If the above processes end, the device is again changed to the RRC connection (RRC_CONNECTED) state to prepare a process of transmitting and receiving data.

Figure 6:
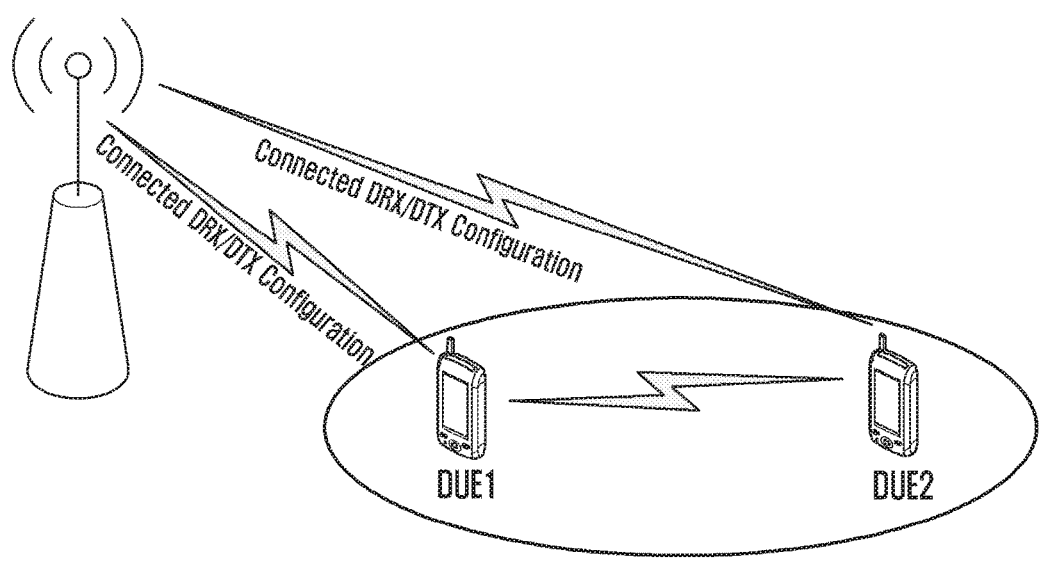
FIG. 6 is a diagram illustrating a general D2D low power system.

FIG. 6 is a diagram illustrating a general D2D low power system.

In the case of the cellular system, the D2D resource allocation and maintenance are controlled by the base station. Therefore, for the device to perform the D2D communication, the RRC_CONNECTED state between the device and the base station needs to be basically maintained.

Meanwhile, when the device performing the D2D communication mostly performs data communication between the device and a paired opponent device rather than between the device and the base station, each device applies the DRX in the RRC connection (RRC_CONNECTED) state to the connection with the base station.

Therefore, the device performing the D2D communication may minimize the current consumption due to the communication between the base station and the device.

Figure 7:
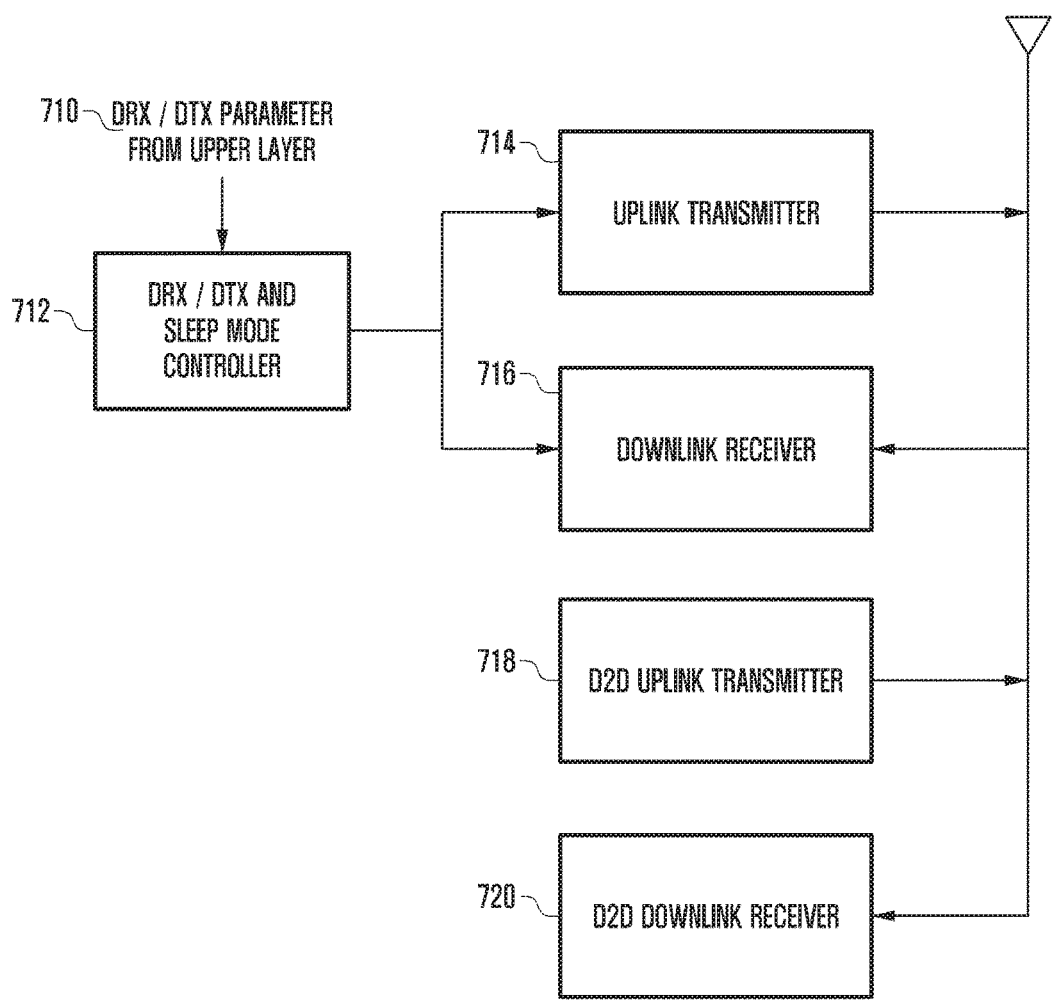
FIG. 7 is a block diagram illustrating a structure of a general D2D low power device.

FIG. 7 is a block diagram illustrating a structure of a general D2D low power device.

As illustrated in FIG. 7, the device is configured to include a DRX/DTX & sleep mode controller 712, an uplink transmitter 714 that is a transmitting and receiving apparatus for communication with the base station, a downlink receiver 716, a D2D uplink transmitter 718 that is a transmitting and receiving apparatus for D2D communication, and a downlink receiver 720.

FIG. 7 illustrates that the transmitting and receiving apparatuses are an individual device, but according to the implementation, it is to be noted that the transmitting and receiving apparatuses may be performed by being changed to share resources of the transceiver for communication with a D2D transceiver and the base station.

The DRX/DTX & sleep mode controller 712 controls a turn on/off of the downlink receiver and the uplink transmitter on the basis of the DRX parameter, the data inactivity timer, or the like in response to the RRC state of the device.

Based on the foregoing contents, the DRX configuration is defined as the operation between the base station and the device, and thus the related parameter from the base station is set and operated.

Therefore, the DRX related parameter set between the base station and the device is hard to apply the DRX in the D2D_connected state between the devices. Describing as an example, upon the implementation of the existing DRX, the base station is assumed to be in the active state at all times, and therefore only the DRX for the device is defined. Based on the defined DRX, the base station transmits data in an active interval. On the other hand, in the case of the D2D communication, unlike the base station, when both of the device performing the D2D communication and the opponent device drive the DRX, the transmitting and receiving time of each device may be confirmed by using the DRX information on both of the paired devices.

Further, as described above, the sleep mode is driven only in the RRC idle (RRC_IDLE) state. By the way, each device performing the D2D communication needs to maintain the RRC connection (RRC_CONNECTED) state that is in the connected state with the base station. Therefore, the device performing the D2D communication may not enter the sleep mode.

If the D2D communication is in the inactive state for a substantial period of time regardless of the RRC state between the device and the base station, when the D2D transceiver forcibly enters the sleep mode, the receiver is periodically operated to confirm whether data transmitted from the opponent device are present, which may be the current consumption factor.

The present invention proposes the following method to solve the above problem. That is, the device performing the D2D communication exchanges a D2D DRX related parameter with the opponent device just before the device enters the sleep mode. Further, when the device entering the sleep mode intends to transmit the paging signal to the opponent device, it is requested that the device does not directly transmit the paging signal to the opponent device but transmit the paging signal to the base station. In that case, the base station transmits the paging signal to the corresponding device.

The embodiment of the present invention will be described below in detail with reference to the accompanying drawings.

Figure 8:
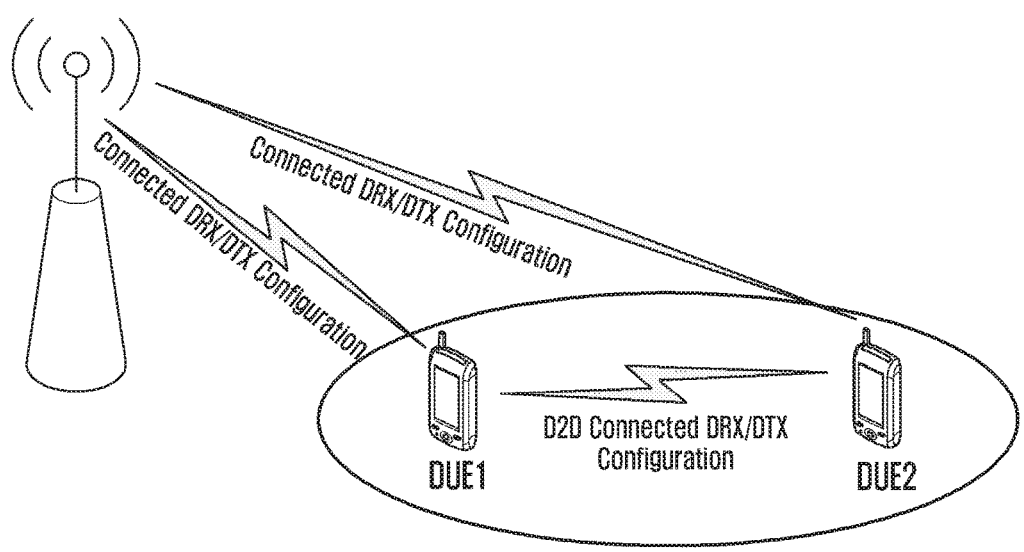
FIG. 8 is a diagram illustrating a structure of a low power D2D communication system according to an embodiment of the present invention.

FIG. 8 is a diagram illustrating a structure of a low power D2D communication system according to an embodiment of the present invention.

The base station controls communication between the devices. Further, the base station pairs the D2D communication device and allocates resources for performing communication. Further, for the low power driving of the device, the base station transfers the DRX/DTX related parameter to each device.

FIG. 8 illustrates a process of allowing the connected DRX/DTX configuration to transfer the DRX parameter by the communication between the base station and the device.

The DUE1 and the DUE2 are target devices of the D2D communication and according to the embodiment of the present invention, may include a function of individually turning on/off the D2D transceiver.

The D2D connected DRX/DTX configuration of FIG. 8 may mean that the low power parameter is shared between the devices performing the D2D communication through a D2D communication link.

For the description of the present invention, the case in which the transmitting and receiving apparatus of the D2D devices is turned off is shown in the D2D sleep and D2D idle state.

Figure 9:
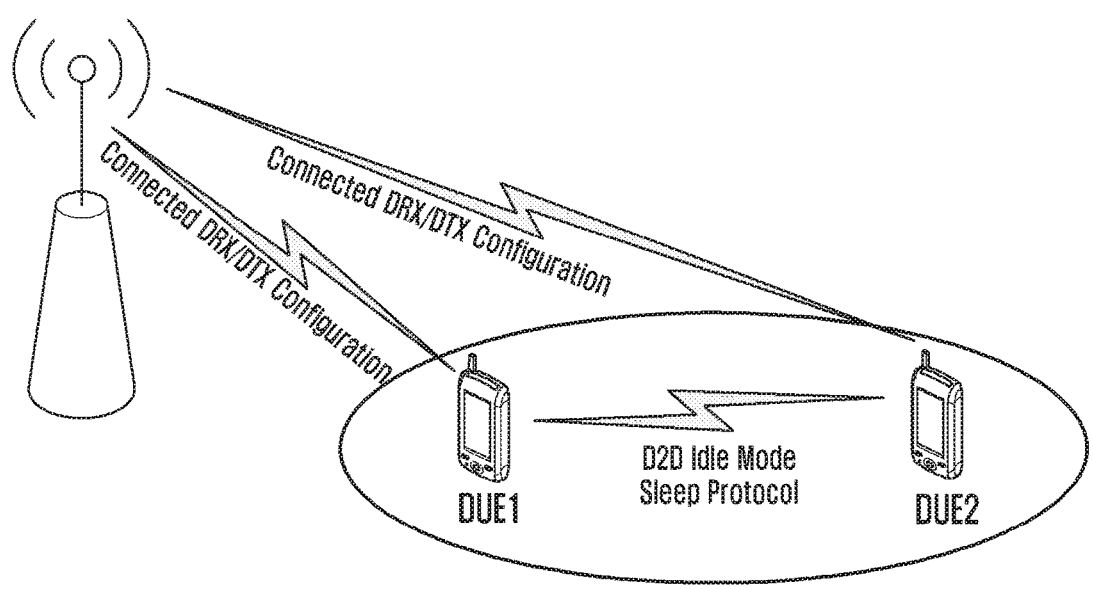
FIG. 9 is a diagram illustrating a structure of a D2D communication system implementing a D2D sleep mode according to an embodiment of the present invention.

FIG. 9 is a diagram illustrating a structure of a D2D communication system implementing a D2D sleep mode according to an embodiment of the present invention.

The DUE1 and the DUE2 show a device supporting the D2D sleep mode.

A D2D idle mode sleep protocol shows sleep mode entry related communication between the D2D devices upon the data inactivity of the DUE1 and the DUE2.

When the D2D devices enter the sleep mode, to resume the D2D communication, the D2D devices may transmit or receive the paging signal. However, the transceiver of the D2D devices is in a turn-off state, and therefore may not transmit and receive the paging signal.

The embodiment of the present invention provides a method for solving the above problem. That is, the D2D communication according to the embodiment of the present invention is performed in the state in which the connection state between the base station and the device is maintained. Considering this, the present invention proposes a method for transmitting and receiving a paging signal through a base station.

Figure 10:
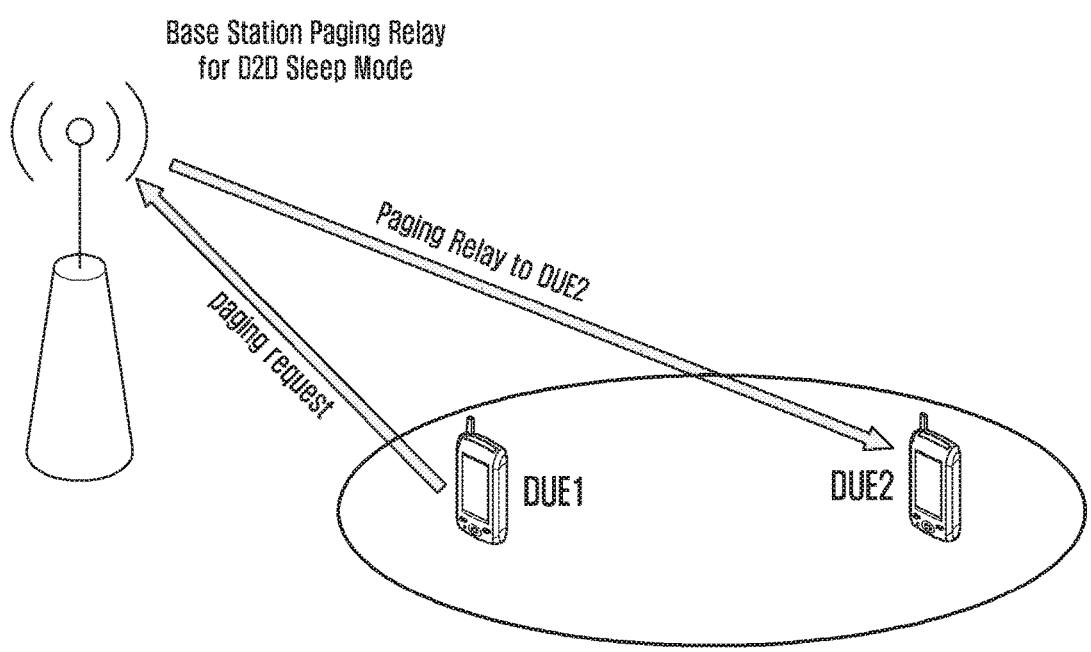
FIG. 10 is a diagram illustrating a method for relaying a paging signal using a connection between a base station and D2D devices according to an embodiment of the present invention.

FIG. 10 is a diagram illustrating a method for relaying a paging signal using a connection between a base station and D2D devices according to an embodiment of the present invention.

First, it is assumed that the DUE1 and the DUE2 are in the sleep mode state, the DUE1 first ends the sleep mode and resumes the data transmission through the D2D communication.

In that case, the paging signal for the DUE2 which is generated in the DUE1 is transferred to the base station through the connection between the DUE1 and the base station. In that case, the base station transfers the paging signal to the DUE2 through the connection between the base station and the DUE2 to end the sleep mode of the DUE2.

Figure 11:
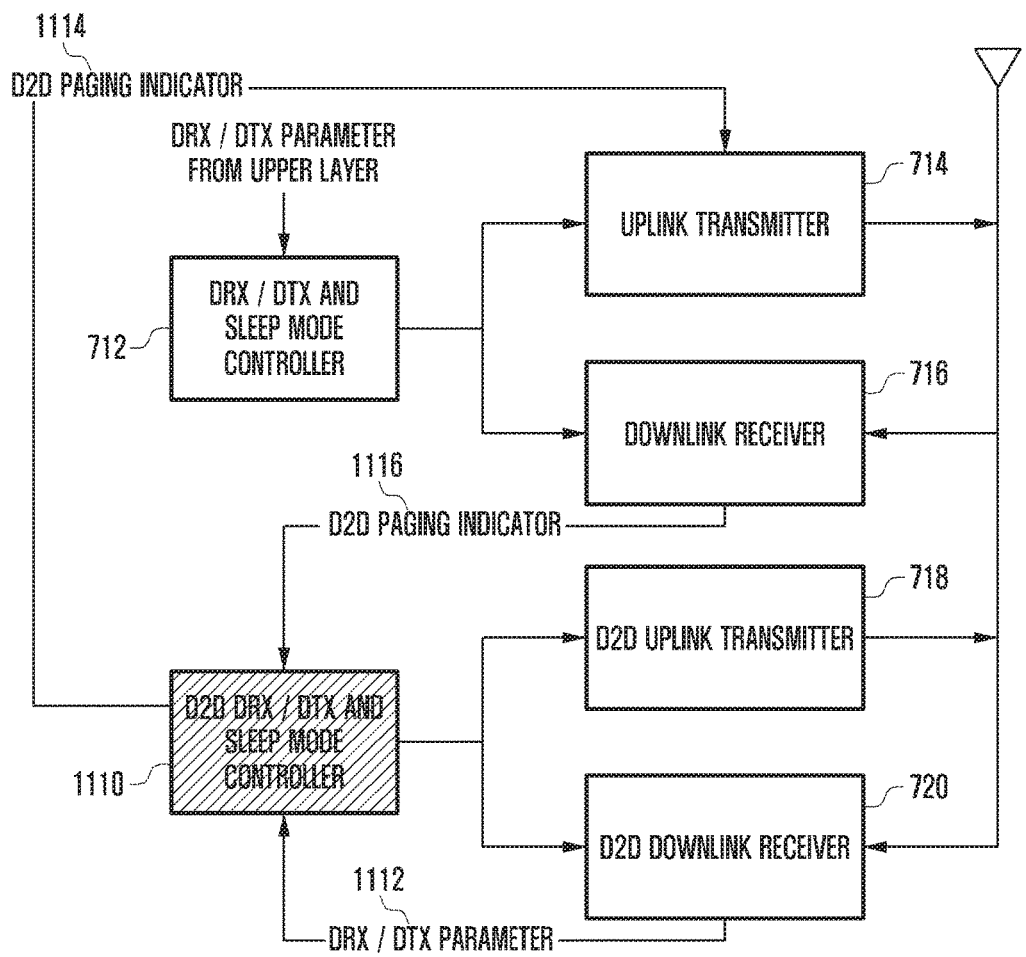
FIG. 11 is a block diagram illustrating an internal structure of a device performing D2D communication according to an embodiment of the present invention.

FIG. 11 is a block diagram illustrating an internal structure of a device performing D2D communication according to an embodiment of the present invention.

An uplink transmitter 714 and a downlink receiver 716 each represent a transmitting and receiving apparatus for communication with the base station.

An uplink transmitter 718 and a D2D downlink receiver 720 each represent a transmitting and receiving apparatus for D2D communication.

FIG. 11 illustrates that the transmitting and receiving apparatuses are an individual device, but according to the implementation, it is to be noted that the transmitting and receiving apparatuses may be performed by sharing resources of the transceiver for communication with the D2D transceiver and the base station.

The DRX/DTX & sleep mode controller 712 (or referred to as a controller) controls the turn on/off of the downlink receiver and the uplink transmitter on the basis of the DRX related parameter, the data inactivity timer, or the like in response to the RRC state of the device.

A D2D DRX/DTX & sleep mode controller 1110 controls the D2D downlink receiver and the D2D uplink transmitter on the basis of the DRX related parameter, the data inactivity timer, or the like.

The parameter for the D2D DRX/DTX & sleep control is determined on the basis of the negotiation between the D2D devices. Further, the device receives (1112) the parameter from the D2D downlink receiver 720 and applies the received parameter.

A D2D paging indicator is signal that is used when using the D2D paging relay in the sleep mode of the present invention.

The device may transmit the D2D paging indicator 1114 paging the opponent D2D device to the uplink transmitter 714 through the base station.

Further, the opponent device transmits the D2D paging indicator 1116, which is relayed from the base station, to the downlink receiver 716 and transmits it to the D2D DRX/DTX & sleep mode controller 1110.

Further, although not illustrated in the drawings, the base station may be configured to include a transceiver transmitting and receiving to and from a device and controlling a signal between the respective blocks. In this case, the controller of the base station may perform a control to receive the paging signal for the second device, which is the opponent device of the first device, from the first device performing the device to device (D2D) communication and transmit the received paging signal to the second device.

Hereinafter, in order that the device is operated in the efficient low power mode while performing the D2D communication, a process of exchanging the D2D DRX parameter between the D2D devices is first defined. The D2D DRX parameter includes information required to allow the device performing the D2D communication to perform the DRX operation between the base station or the opponent device. For example, the D2D DRX parameter may include information on a DRX period, a DRX application time, a length of an active interval, or the like.

The process of exchanging the D2D DRX parameter may be performed by the D2D DRX configuration operation and the D2D sleep mode operation.

The process of performing the D2D DRX configuration may include a dRX parameter negotiation process between the D2D devices and a process of receiving a configuration from the base station.

Further, the D2D sleep mode operation includes an operation of allowing the D2D devices themselves to enter the sleep mode and an operation of allowing the D2D devices to receive a sleep mode request from another D2D device and then the D2D devices to enter the sleep mode. Further, the operation may include a process of relaying the paging signal through the base station and transferring the relayed paging signal to the opponent D2D device when the D2D devices wake up from the sleep mode.

Figure 12:
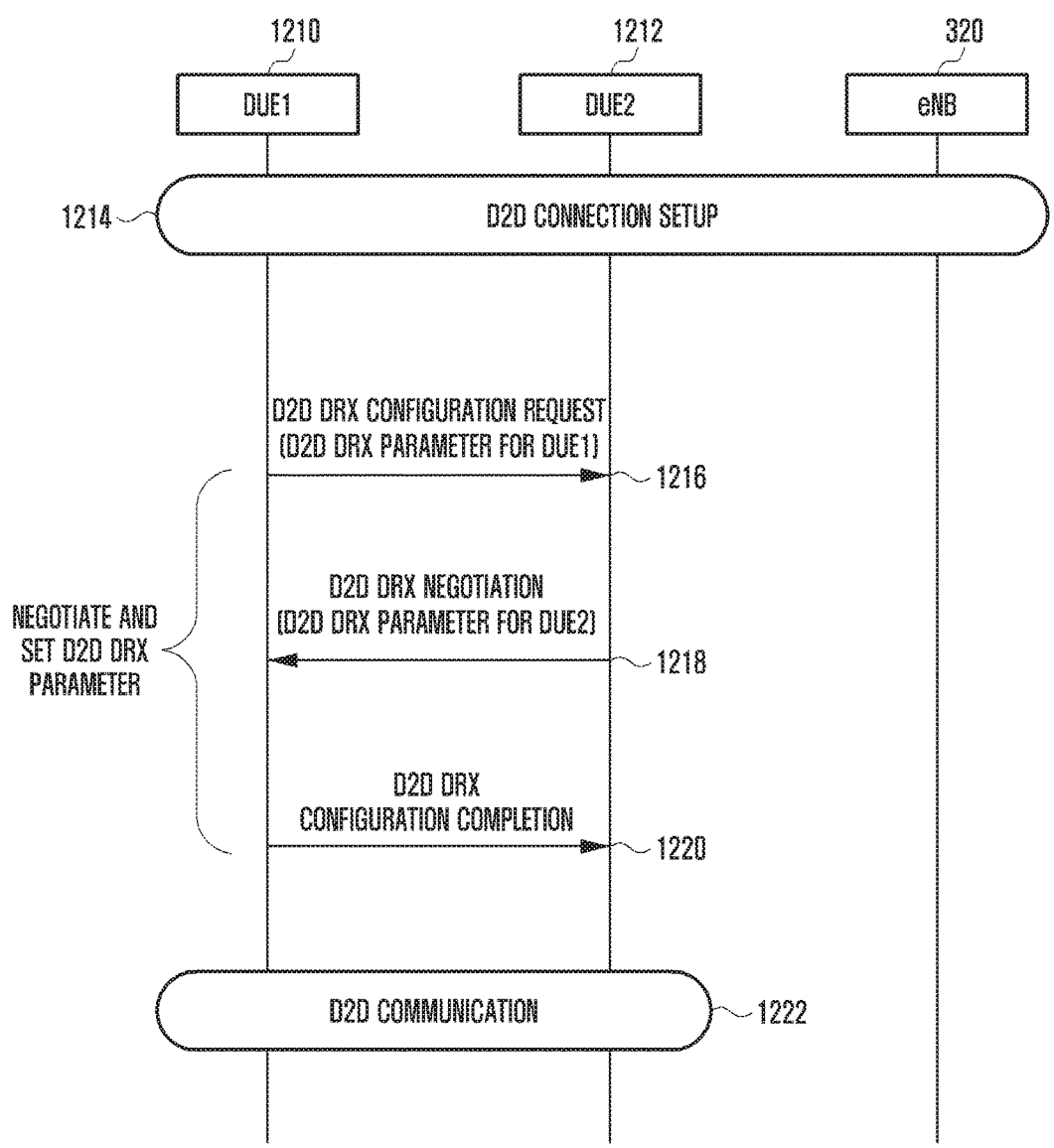
FIG. 12 is a flow chart illustrating a DRX parameter negotiation process between D2D devices.

FIG. 12 is a flow chart illustrating a DRX parameter negotiation process between D2D devices according to an embodiment of the present invention.

FIG. 12 is a diagram illustrating a message exchange process between D2D devices for D2D DRX.

First, for the D2D communication, a D2D connection setup process 1214 is performed on the basis of a procedure of transmitting and receiving a control signal between D2D devices 1210 and 1212 and the eNB 320 and discovering an opponent device.

If the connection between the D2D devices is completed, a negotiation and configuration process for the D2D DRX mode is performed. For this purpose, a DUE1 1210 transmits (1216) a DRX configuration request to a DUE2 1212 to transmit a DRX parameter.

Next, the DRX configuration procedure is finally completed (1220) on the basis of a parameter negotiation process 1218 from the DUE2 1212.

Various embodiments of the negotiation process may be present. For example, the DRX parameter transmitted from the DUE1 1210 to the DUE2 1212 may be modified by the DUE2 1212 and then may be again transmitted to the DUE1 1210. Alternatively, when the DUE2 1212 receives the DRX parameter from the DUE1 1210, the DUE2 1212 may also transmit a newly generated DRX parameter to the DUE1 1210 again. The processes, that is, processes 1216 and 1218 may be repeatedly performed plural times and if the DRX parameter satisfying both devices is derived, the D2D DRX configuration completion message is transmitted.

Figure 13:
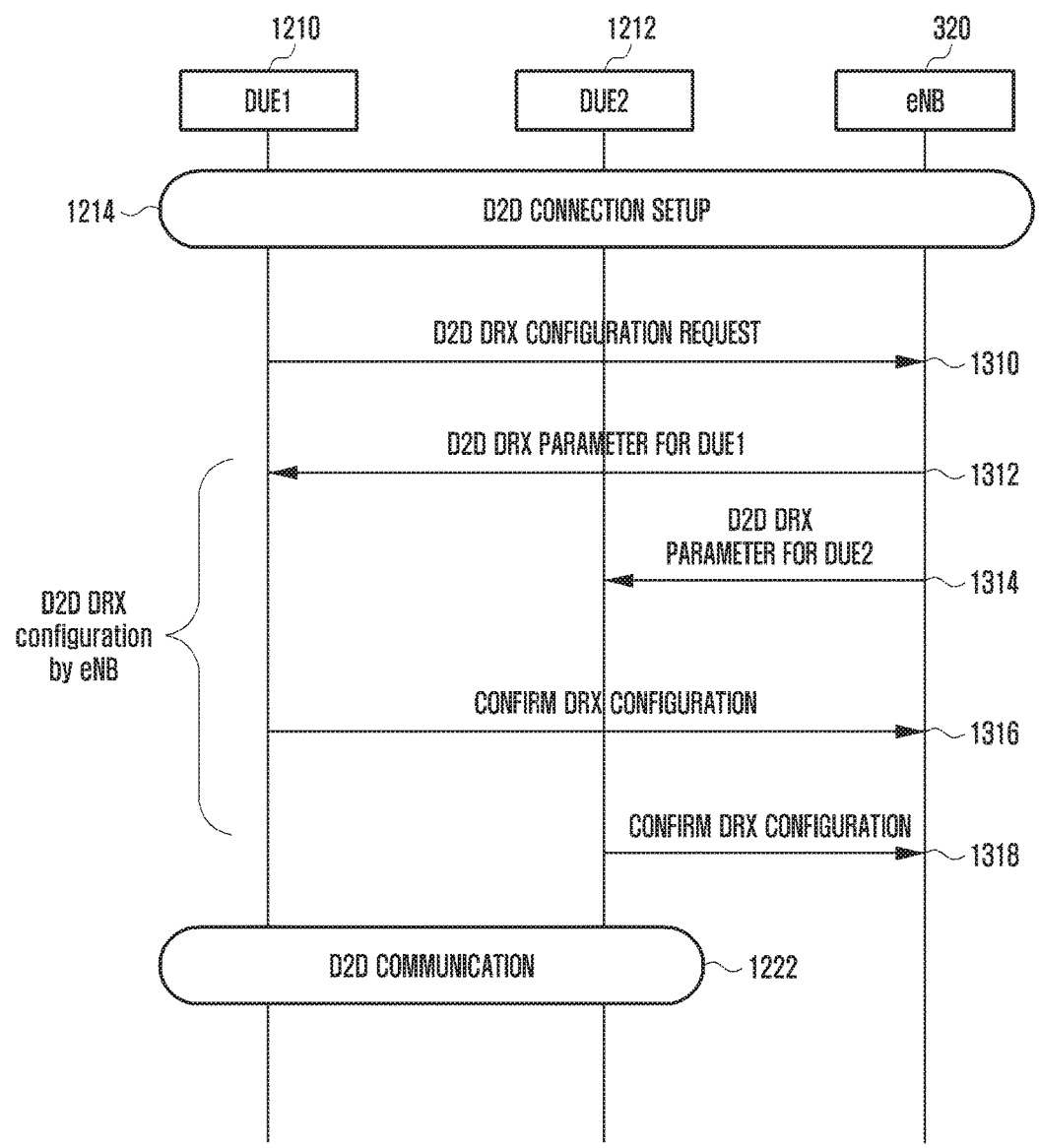
FIG. 13 is a flow chart illustrating a process of receiving a DRX configuration from a base station according to an embodiment of the present invention.

FIG. 13 is a flow chart illustrating a process of receiving a DRX configuration from a base station according to an embodiment of the present invention.

Like FIG. 12, the embodiment illustrated in FIG. 13 may be performed when it is difficult to perform the DRX parameter negotiation process between the D2D devices, but is not necessarily limited thereto.

When it is difficult for the D2D device to perform the DRX parameter negotiation process with the opponent device, the D2D device may receive the DRX parameter from the base station to complete the D2D DRX configuration procedure.

First, when the D2D devices perform the D2D communication, it is assumed that the D2D connection is configured (1214).

Next, the D2D device 1210 requests (1310) the D2D DRX configuration to the eNB 320. The eNB 320 receiving the request transmits (1312 and 1314) the D2D DRX parameter to each of the devices 1210 and 1212 performing the D2D communication.

In that case, the D2D devices 1210 and 1212 transmit (1316 and 1318) acknowledgment corresponding to the reception of the D2D DRX parameter to the eNB 320.

Next, each device 1210 and 1212 performs (1222) the D2D communication with the opponent device.

Figure 14:
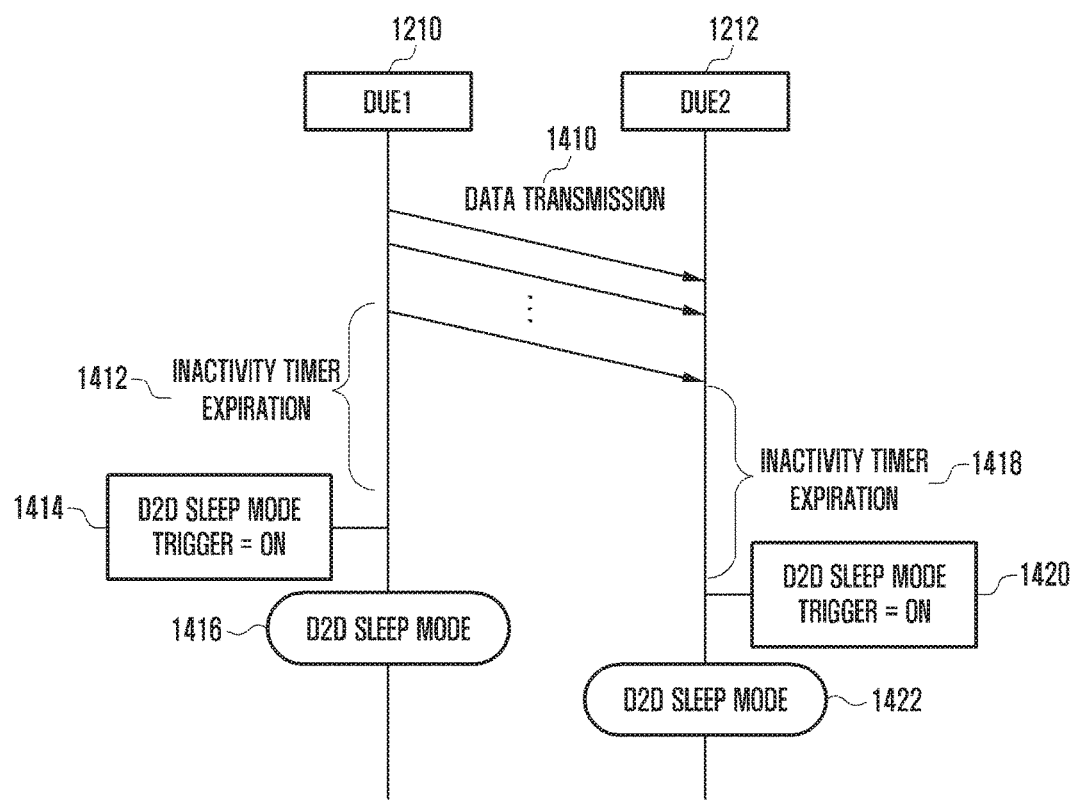
FIGS. 14 and 15 are flow charts illustrating a process of allowing a device operated as a D2D DRX to enter a D2D sleep mode.
Figure 15:
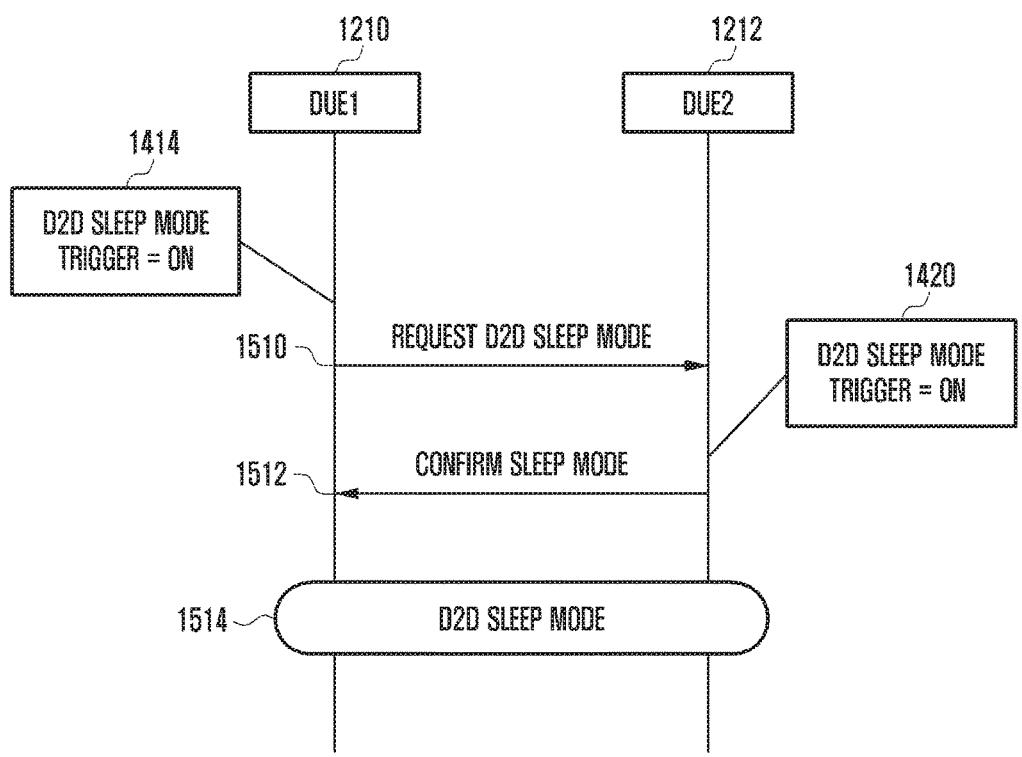

FIGS. 14 and 15 are flow charts illustrating a process of allowing a device operated as a D2D DRX to enter a D2D sleep mode.

First, FIG. 14 is a flow chart illustrating a process of allowing a device to enter a self sleep mode after D2D communication.

The DUE1 1210 transmits (1410) data to the DUE2 1212. Next, if data are not transmitted, the inactivity timer is operated.

If data are not transmitted during the driving of the inactivity timer, the inactivity timer expires (1412). Further, the DUE1 1210 enters (1416) the sleep mode while a D2D sleep mode trigger of the DUE1 1210 is turned on (1414).

Further, if the DUE2 1212 receives data from the DUE1 1210 and then does not receive data, the inactivity timer is operated. Further, if data are not received during the driving of the inactivity timer, similarly, the inactivity timer expires (1418). Further, the DUE2 1212 enters (1422) the sleep mode while the sleep mode trigger of the DUE2 1212 is turned on.

As illustrated in FIG. 14, since the DUE1 1210 and the DUE2 1212 each enter the sleep mode, time taken to allow each device to enter the sleep mode may be different at each device.

FIG. 15 is a flow chart illustrating a process of allowing each device to enter a sleep mode in response to a sleep mode (entry) request after D2D communication.

For example, if a call is received from the eNB while communication between the D2D devise 1210 and 1212 is performed, the corresponding device needs to process the call from eNB after temporarily stopping the D2D communication.

In this case, the sleep mode request may be transmitted between the devices performing the D2D communication.

The case in which the DUE1 1210 transmits the sleep mode request message will be described with reference to FIG. 15. For this purpose, the DUE1 1210 turns on (1414) the sleep mode trigger and then may transmit the D2D sleep mode request 1510 to the DUE2 1212.

In that case, if the DUE2 1212 requests the sleep mode request message from the DUE1 1210, the sleep mode trigger of the DUE2 1212 is turned on (1420). Further, the DUE 1212 transmits (1512) the acknowledgment for the sleep mode request to the DUE1 1212.

Next, the DUE1 1210 and the DUE2 1212 enter (1514) the D2D sleep mode.

Figure 16:
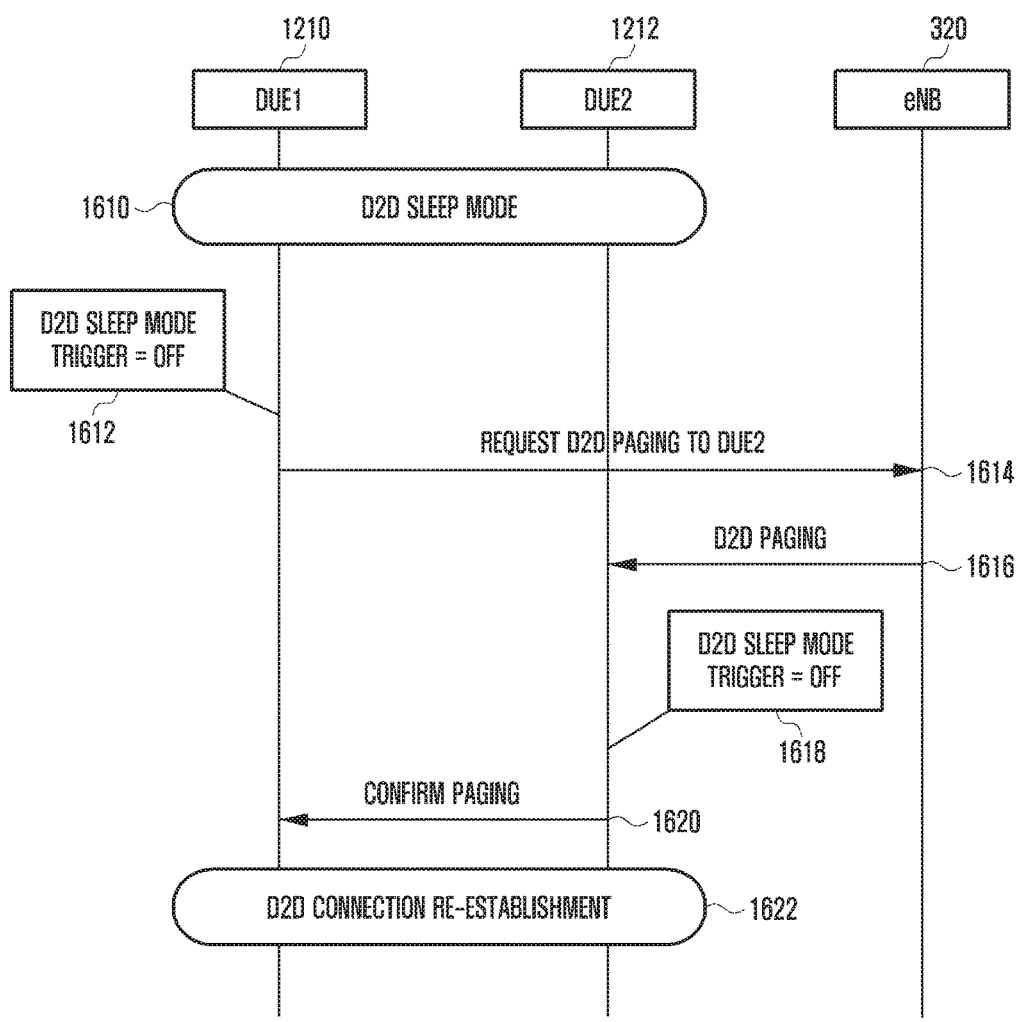
FIG. 16 is a flow chart illustrating a paging signal relay process of a base station according to an embodiment of the present invention.

FIG. 16 is a flow chart illustrating a paging signal relay process of a base station according to an embodiment of the present invention.

As illustrated in FIG. 16, the paging signal relay process according to the embodiment of the present invention may include a D2D sleep mode entry operation, a paging signal relay operation of the base station, and a D2D connection re-establishment operation.

While the DUE1 1210 and the DUE2 1212 is in the D2D sleep mode operation (1610), data to be transmitted from the DUE1 1210 to the DUE2 1212 may be generated. In this case, the DUE1 1210 turns off 1612 the D2D sleep mode trigger and transmits 1614 a D2D paging request message to the eNB 320.

In that case, the eNB 320 transfers (relays) (1616) the paging signal received from the DUE1 1210 to the DUE2 1212. In that case, the DUE2 1212 turns off (1618) the sleep mode trigger and is out of the sleep mode. That is, the DUE2 1212 may change a mode from the sleep mode to the active mode.

Thereafter, the DUE2 1212 transmits (1620) paging Ack to the DUE1 1210 and thus the D2D connection between the devices is re-established (1622).

Figure 17:
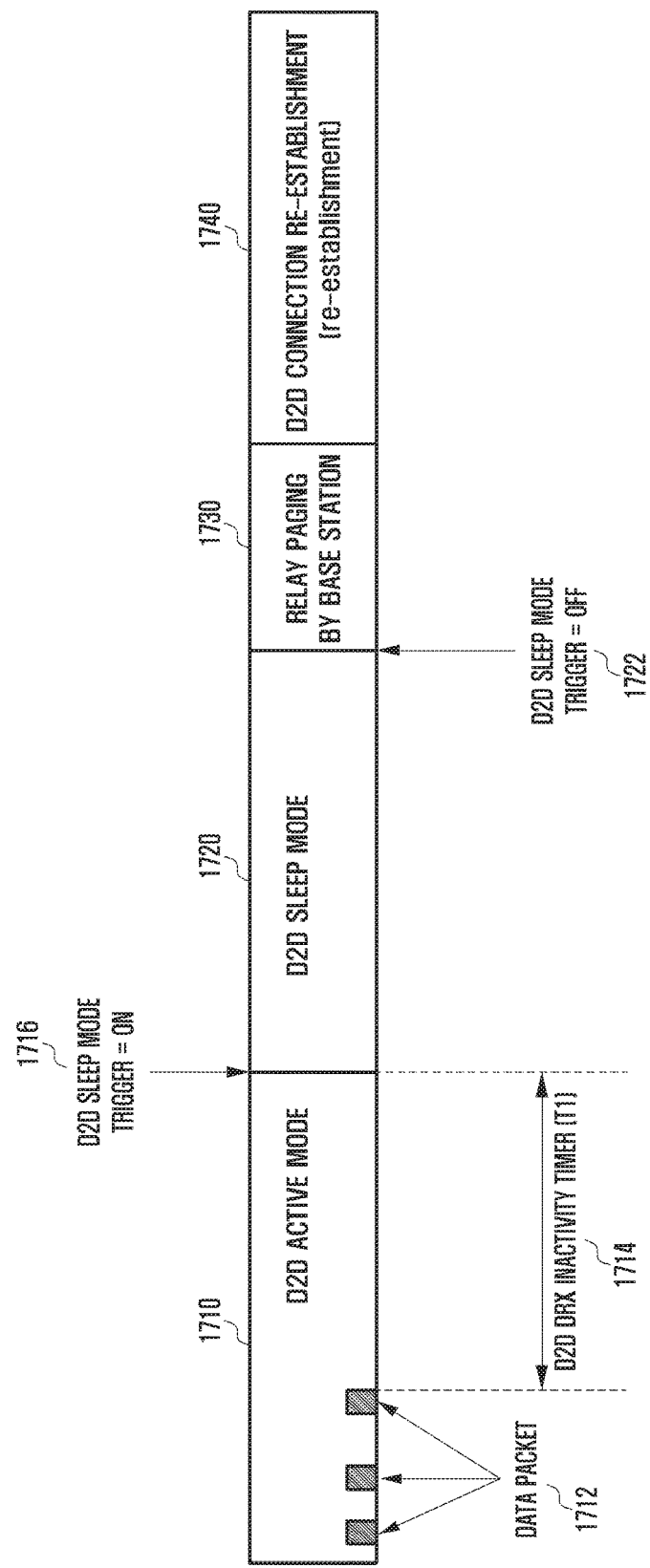
FIGS. 17 and 18 are diagrams illustrating an example of a case of re-establishing the D2D connection and a case of releasing a D2D mode, after entering the sleep mode according to an embodiment of the present invention.
Figure 18:
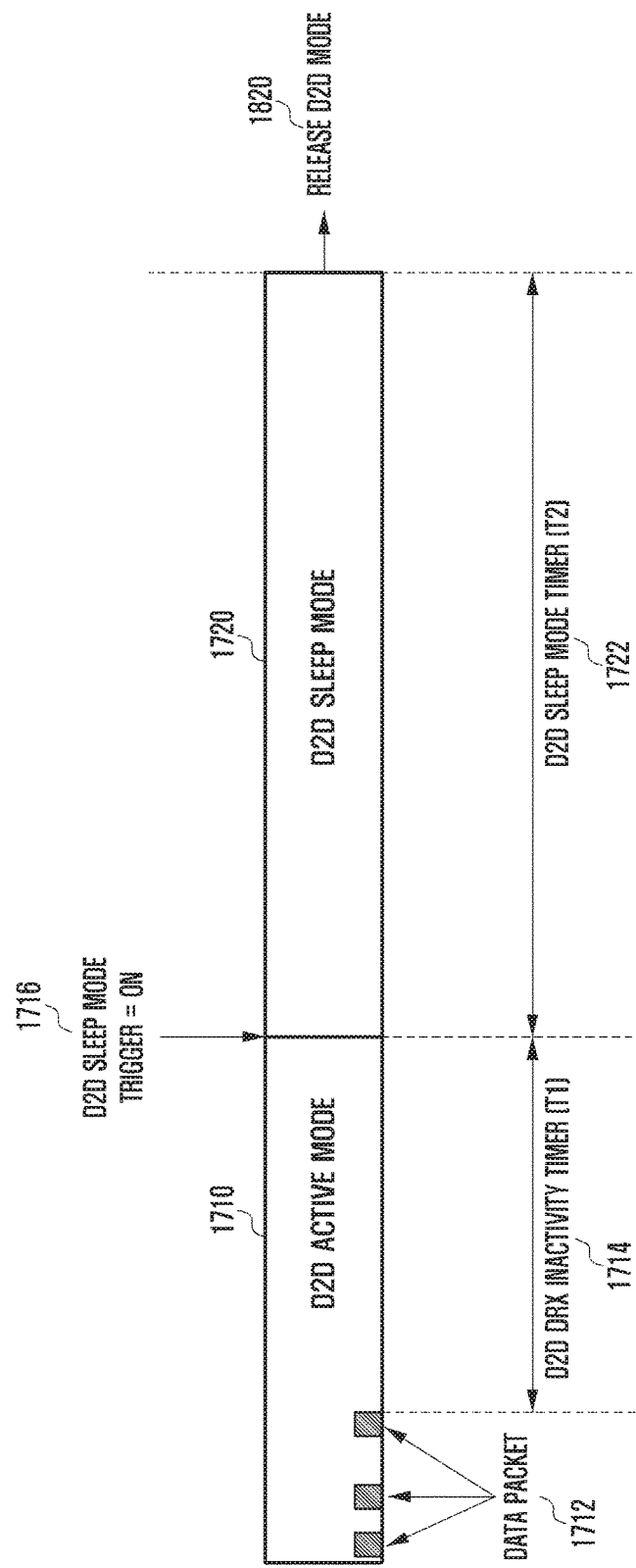

FIGS. 17 and 18 are diagrams illustrating an example of a case of re-establishing the D2D connection and a case of releasing a D2D mode, after entering the sleep mode according to an embodiment of the present invention.

First, FIG. 17 is a diagram illustrating an operation of receiving a paging signal to be relayed by the base station after entering a sleep mode to re-establish a D2D connection.

The D2D device transmits (1712) data in an active mode 1710. Next, if data to be transmitted for D2D DRX inactivity time T1 of a D2D DRX inactive timer are not present (1714), the D2D device turns on (1716) the D2D sleep mode trigger. Further, the D2D device enters (1720) the D2D sleep mode.

Thereafter, if data to be again transmitted to the opponent D2D device are present, the D2D device turns off (1722) the D2D sleep mode trigger. In that case, the D2D device wakes up from the sleep mode and transmits (1730) the paging signal to the eNB.

Next, the D2D device goes through a process of re-establishing (1740) a D2D connection to resume the D2D communication.

On the contrary, if data are not transmitted or received from the D2D device for a predetermined time in the sleep mode, the D2D device performs a D2D mode release operation turning off the D2D mode.

FIG. 18 is a diagram illustrating an example of a D2D mode release operation mode.

Like FIG. 17, if data are not transmitted or received in the D2D communication for a predetermined time (1714) the D2D device enters (1716) the D2D sleep mode.

Thereafter, if data to be transmitted for a predetermined time, that is, a T2 time 1810 of the D2D sleep mode timer even in the D2D sleep mode are not present or the paging signal is not received from the eNB, the D2D sleep mode timer (1722) expires. In that case, the D2D devices turn of the D2D mode to release (1820) the D2D mode.

If the D2D mode is turned off, unlike the sleep mode, the discovery procedure, the D2D connection setup, and the resource allocation process need to be performed again to perform the D2D communication again.

According to the present invention, the base station relays the paging message transmitted from the device supporting the direct device to device communication, and therefore the device that is being operated in the sleep mode need not monitor whether the signal from the opponent device performing the direction device to device communication is received or not and is enough to monitor only whether the signal from the base station is received. As a result, it is possible to reduce the power consumption of the device supporting the direct device to device communication.

The embodiments of the present invention disclosed in the present specification and the accompanying drawings have proposed specific examples in order to easily describe the contents of the present invention and assist in understanding the present invention and do not limit the scope of the present invention. It is obvious to those skilled in the art to which the present invention pertains that various modifications may be made without departing from the scope of the present invention, in addition to the embodiments disclosed herein.

The invention claimed is:

1. A method by a device in a wireless communication system supporting a direct device to device (D2D) communication, the method comprising:
    transmitting, to an opponent device, a first D2D parameter associated with a discontinuous reception (DRX) for a D2D communication with the opponent device;
    receiving, from the opponent device, a second D2D parameter associated with the DRX for the D2D communication with the opponent device;
    entering a sleep mode during the D2D communication with the opponent device, based on the second D2D parameter;
    transmitting a paging signal for the opponent device to a base station connected to the device to request a transmission of the paging signal to the opponent device, based on data to be transmitted to the opponent device being generated during the sleep mode;
    receiving, from the opponent device, a paging acknowledgment signal in response to the paging signal; and
    resuming the D2D communication based on the paging acknowledgment signal, with the opponent device which received the paging signal through the base station.

2. The method of claim 1, further comprising:
    performing the sleep mode based on the second D2D parameter.

3. The method of claim 1, wherein the device enters the sleep mode when an inactivity timer expires.

4. The method of claim 1, wherein the entering of the sleep mode comprises:
transmitting a sleep mode request message to the opponent device; and
entering the sleep mode when a response message corresponding to the sleep mode request message is received from the opponent device.

5. The method of claim 1, further comprising releasing the D2D communication after the entering the sleep mode, if there is no data to transmit until a preset timer expires.

6. A device in a wireless communication system supporting a direct device to device (D2D) communication, the device comprising:
a transceiver configured to transmit and receive a signal; and
at least one processor configured to:
transmit, to an opponent device, a first D2D parameter associated with a discontinuous reception (DRX) for a D2D communication with the opponent device,
receive, from the opponent device, a second D2D parameter associated with the DRX for the D2D communication with the opponent device,
enter a sleep mode during the D2D communication with the opponent device, based on the second D2D parameter,
transmit a paging signal for the opponent device to a base station connected to the device to request a transmission of the paging signal to the opponent device, based on data to be transmitted to the opponent device being generated during the sleep mode,
receive, from the opponent device, a paging acknowledgment signal in response to the paging signal, and
resume the D2D communication based on the paging acknowledgment signal, with the opponent device which received the paging signal through the base station.

7. The device of claim 6, wherein the at least one processor is further configured to perform the sleep mode based on the second D2D parameter.

8. The device of claim 6, wherein the at least one processor is further configured to enter the sleep mode when an inactivity timer expires.

9. The device of claim 6, wherein the at least one processor is further configured to:
transmit a sleep mode request message to the opponent device, and
enter the sleep mode when a response message corresponding to the sleep mode request message is received from the opponent device.

10. The device of claim 6, wherein the at least one processor is further configured to release the D2D communication after entering the sleep mode, if there is no data to transmit until a preset timer expires.

11. A method by a base station in a wireless communication system supporting a direct device to device (D2D) communication, the method comprising:
receiving, from a first device performing a D2D communication with a second device, a paging signal for the second device which is an opponent device of the first device; and
transmitting the received paging signal to the second device,
wherein a D2D parameter associated with a discontinuous reception (DRX) for the D2D communication is negotiated between the first device and the second device before the first device enters a sleep mode,
wherein the paging signal is received from the first device after the first device enters the sleep mode during the D2D communication,
wherein a paging acknowledgment signal is transmitted from the second device to the first device in response to the paging signal, and
wherein the D2D communication is resumed between the first device and the second device based on the paging acknowledgment signal.

12. A base station in a wireless communication system supporting a direct device to device (D2D) communication, the base station comprising:
a transceiver configured to transmit and receive a signal; and
at least one processor configured to:
receive, from a first device performing a D2D communication with a second device, a paging signal for the second device, which is an opponent device of the first device, and
transmit the received paging signal to the second device,
wherein a D2D parameter associated with a discontinuous reception (DRX) for the D2D communication is negotiated between the first device and the second device before the first device enters a sleep mode,
wherein the paging signal is received from the first device after the first device enters the sleep mode during the D2D communication,
wherein a paging acknowledgment signal is transmitted from the second device to the first device in response to the paging signal, and
wherein the D2D communication is resumed between the first device and the second device based on the paging acknowledgment signal.

* * * * *